US012801072B2

(12) United States Patent
Hirai

(10) Patent No.: US 12,801,072 B2
(45) Date of Patent: Nov. 17, 2026

(54) IMAGE FORMING APPARATUS AND IMAGE FORMING SYSTEM FOR PREDICTING LIFE OF TRANSFER MEMBER BASED ON TONER AMOUNT INFORMATION

(71) Applicant: CANON KABUSHIKI KAISHA, Tokyo (JP)

(72) Inventor: Masahide Hirai, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/955,295

(22) Filed: Nov. 21, 2024

(65) Prior Publication Data

US 2025/0172897 A1 May 29, 2025

(30) Foreign Application Priority Data

Nov. 27, 2023 (JP) ................................ 2023-199632

(51) Int. Cl.
*G03G 15/00* (2006.01)
*G03G 15/16* (2006.01)

(52) U.S. Cl.
CPC ....... *G03G 15/553* (2013.01); *G03G 15/1675* (2013.01); *G03G 15/5079* (2013.01); *G03G 15/80* (2013.01)

(58) Field of Classification Search
None
See application file for complete search history.

(56) References Cited

U.S. PATENT DOCUMENTS

| | | | | |
|---|---|---|---|---|
| 7,676,164 B2 * | 3/2010 | Shiori | ................ | G03G 21/1875 399/24 |
| 9,158,242 B2 * | 10/2015 | Saito | .................... | G03G 15/553 |

FOREIGN PATENT DOCUMENTS

| | | |
|---|---|---|
| JP | 2003195700 A | 7/2003 |
| JP | 2006258935 A | 9/2006 |
| JP | 2019086697 A | 6/2019 |
| JP | 2022178032 A | 12/2022 |

OTHER PUBLICATIONS

English translation of JP-2006258935-A (Year: 2006).*

* cited by examiner

*Primary Examiner* — Arlene Heredia Ocasio
(74) *Attorney, Agent, or Firm* — Canon U.S.A., Inc. IP Division

(57) ABSTRACT

An image forming apparatus includes an image carrying member that carries a toner image formed based on image information, a transfer member that transfers the toner image carried on the image carrying member, a voltage application unit that applies a voltage to the transfer member, and a control unit that obtains information about an amount of toner in the toner image from the image information, obtains a correction value by correcting a voltage to be applied to the transfer member based on the information about the amount of toner, and obtains data on prediction of a life of the transfer member based on the correction value.

16 Claims, 10 Drawing Sheets

FIG.4

| AMOUNT OF TONER | REQUIRED VOLTAGE V | α |
|---|---|---|
| 100% | 3100 | 0.82 |
| 125% | 3200 | 0.84 |
| 150% | 3400 | 0.89 |
| 175% | 3600 | 0.95 |
| 200% | 3800 | 1 |

IMAGE FORMING APPARATUS AND IMAGE FORMING SYSTEM FOR PREDICTING LIFE OF TRANSFER MEMBER BASED ON TONER AMOUNT INFORMATION

BACKGROUND

Field

The present disclosure relates to an image forming apparatus, such as a copying machine and a printer, which uses an electrophotographic method or an electrostatic recording method.

Description of the Related Art

As electrophotographic image forming apparatuses, an image forming apparatus that directly transfers a toner image to a transfer material from a photosensitive member and an image forming apparatus that employs an intermediate transfer method in which a toner image primarily transferred to an intermediate transfer belt from a photosensitive member is secondarily transferred to a transfer member have heretofore been known.

In such image forming apparatuses, during image formation, a transfer bias is constantly applied to a transfer member, so that a resistance value of the transfer member irreversibly increases over time of use of the image forming apparatus.

If the resistance value of the transfer member is changed to a predetermined value or greater, a voltage required for transfer cannot be applied, so that a transfer defect occurs, which makes it difficult to perform satisfactory image formation. To address this issue, for example, a method for setting a predetermined life of the transfer member based on the number of prints or a total rotation time can be used. A method for measuring the resistance value of the transfer member over a long period of use and predicting a time when the measured resistance value falls outside a predetermined allowable range as the life of the transfer member is also known.

In addition, a method for predicting the life of the transfer member based on an increase in a required transfer voltage to obtain a satisfactory transfer property over a long period of use has also been discussed.

In the case of measuring the resistance value of the transfer member to predict the life of the transfer member, measurement of the resistance value of the transfer member or the like is affected by an environment, such as a temperature and humidity during the measurement of the resistance value. Therefore, to accurately detect the resistance value, Japanese Patent Application Laid-Open No. 2003-195700 discusses a method for accurately measuring the resistance value of a transfer member based on the resistance value of the transfer member detected by a resistance detection unit and an environment detected by an environment detection unit, to thereby determine the life of the transfer member.

SUMMARY

According to an aspect of the present disclosure, an image forming apparatus includes an image carrying member configured to carry a toner image formed based on image information, a transfer member configured to transfer the toner image carried on the image carrying member, a voltage application unit configured to apply a voltage to the transfer member, and a control unit configured to obtain information about an amount of toner in the toner image from the image information, obtain a correction value by correcting a voltage to be applied to the transfer member based on the information about the amount of toner, and obtain data on prediction of a life of the transfer member based on the correction value.

Further features of the present disclosure will become apparent from the following description of exemplary embodiments with reference to the attached drawings.

BRIEF DESCRIPTION OF THE DRAWINGS

FIG. 4 is a table illustrating an amount of toner and a required transfer voltage according to the first exemplary embodiment.

DESCRIPTION OF THE EMBODIMENTS

Figure 1:
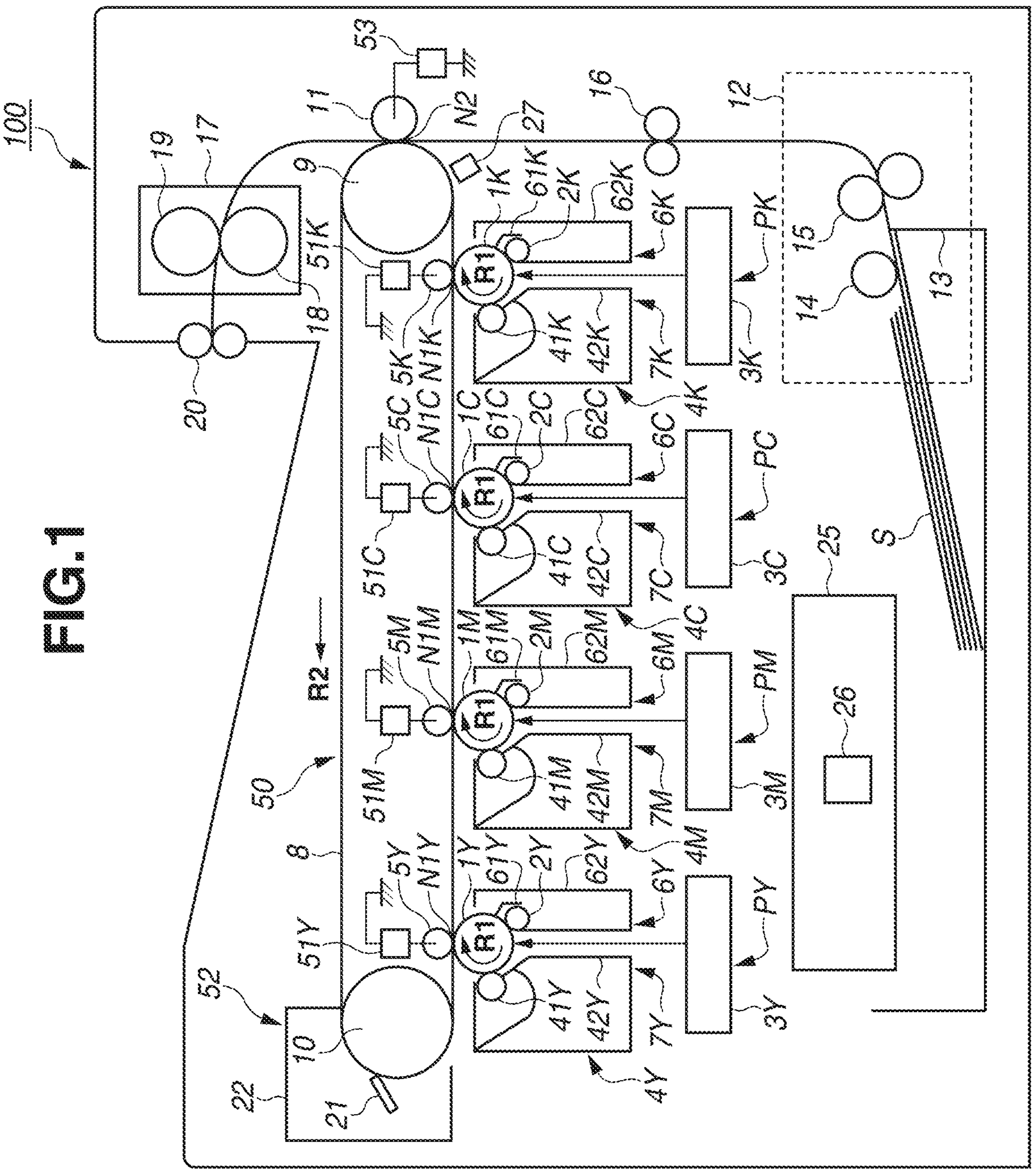
FIG. 1 is a schematic sectional view of an image forming apparatus according to a first exemplary embodiment of the present disclosure.

An image forming apparatus according to an exemplary embodiment of the present disclosure will be described in detail below with reference to the attached drawings. The following exemplary embodiments are not intended to limit the disclosure. Multiple features are described in the exemplary embodiments, but not all such features are essential to the present disclosure, and the multiple features may be combined as appropriate. Furthermore, in the attached drawings, identical or similar components are denoted by the same reference numeral, and a redundant description thereof is omitted.

1. Overall Configuration of Image Forming Apparatus

FIG. 1 is a schematic sectional view of an image forming apparatus that constitutes an image forming system according to a first exemplary embodiment of the present disclosure. An image forming apparatus 100 according to the first exemplary embodiment is an image forming apparatus (laser printer) of a tandem type that employs an intermediate transfer method to form a full-color image using an electrophotographic method.

The image forming apparatus 100 includes first, second, third, and fourth image forming portions PY, PM, PC, and PK as a plurality of image forming portions. The first, second, third, and fourth image forming portions PY, PM, PC, and PK form yellow (Y), magenta (M), cyan (C), and black (K) toner images, respectively.

In the first exemplary embodiment, configurations and operations of the image forming portions PY, PM, PC, and PK are substantially the same except for the color of toner to be used. Accordingly, if there is no need to distinguish each component, suffixes Y, M, C, and K representing components for respective colors are omitted, and the components will be collectively described.

Each image forming portion P includes a drum-type electrophotographic photosensitive member (photosensitive member), such as a photosensitive drum 1, as an image carrying member. The photosensitive drum 1 is rotationally driven by a drive unit (not illustrated) in a direction indicated by an arrow R1 in FIG. 1. A primary charging roller 2 serving as a primary charging unit composed of a roller-type charging member, an exposure device (laser scanner unit) 3 serving as an exposure unit (image writing unit), and a developing device 4 serving as a developing unit are arranged in a rotation direction of the photosensitive drum 1 around the photosensitive drum 1. Subsequently, a primary transfer roller 5 serving as a first transfer member composed of a roller-type charging member, and a drum cleaner 6 serving as a photosensitive member cleaning unit are also arranged.

The developing device 4 includes a developing roller 41 serving as a developer carrying member, and a toner container 42 that stores toner as developer. The drum cleaner 6 includes a drum cleaning blade 61 serving as a cleaning unit and a waste toner container 62.

An intermediate transfer belt 8 serving as an intermediate transfer member is stretched around a drive roller 9 and a tension roller 10. A driving force is transmitted to the drive roller 9, thereby allowing the intermediate transfer belt 8 to be rotationally driven in a direction indicated by an arrow R2 in FIG. 1.

The primary transfer roller 5 is pressed against the photosensitive drum 1 via the intermediate transfer belt 8, which brings the intermediate transfer belt 8 and the photosensitive drum 1 into contact with each other to form a primary transfer portion (primary transfer nip) N1. On an outer peripheral surface of the intermediate transfer belt 8, a secondary transfer roller 11 serving as a second transfer member composed of a roller-type charging member is arranged at a position opposed to the drive roller 9.

The secondary transfer roller 11 is pressed against the drive roller 9 via the intermediate transfer belt 8, which brings the intermediate transfer belt 8 and the secondary transfer roller 11 into contact with each other to form a secondary transfer portion (secondary transfer nip) N2. On the outer peripheral surface of the intermediate transfer belt 8, a belt cleaner 52 serving as an intermediate transfer belt cleaning unit is arranged at a position opposed to the tension roller 10.

The belt cleaner 52 includes a belt cleaning blade 21 serving as a contact member and a waste toner container 22.

The primary transfer roller 5, the intermediate transfer belt 8, the drive roller 9, the tension roller 10, the belt cleaner 52, and the like constitute an intermediate transfer belt unit 50.

According to the first exemplary embodiment, in each image forming portion P, the photosensitive drum 1, and the primary charging roller 2, the developing device 4, and the drum cleaner 6, serving as process units acting on the photosensitive drum 1, integrally form a process cartridge 7. Process cartridges 7Y, 7M, 7C, and 7K are each configured to be detachably attached to the image forming apparatus 100.

In the present exemplary embodiment, the process cartridges 7Y, 7M, 7C, and 7K have substantially the same configuration, except that yellow (Y) toner, magenta (M) toner, cyan (C) toner, and black (K) toner are stored in toner containers 42Y, 42M, 42C, and 42K, respectively.

The image forming apparatus 100 also includes a control board 25 on which an electric circuit for controlling the image forming apparatus 100 is mounted. The control board 25 includes a central processing unit (CPU) 26 as a control unit. The CPU 26 includes an algorithm for controlling the operation of the image forming apparatus 100 based on signals from a drive control unit, such as a drive source (not illustrated) for conveyance of a transfer material S and a drive source (not illustrated) for driving the intermediate transfer belt 8 and each image forming portion P, a high-voltage control unit for controlling a high voltage to be applied during image formation, a current detection unit, and various sensors (not illustrated) in the image forming apparatus 100, such as a temperature and humidity sensor (environment sensor) for detecting a temperature and humidity, thereby controlling the overall image forming operation of the image forming apparatus 100 in an integrated manner.

2. Transfer Configuration

Next, a configuration for primary transfer and secondary transfer according to the present exemplary embodiment will be described in more detail.

In the present exemplary embodiment, the intermediate transfer belt 8 is used as an intermediate transfer member.

The intermediate transfer belt 8 is an endless belt formed with an electroconductive agent added to a resin material to give conductivity.

The intermediate transfer belt 8 is stretched around two shafts of the drive roller 9 and the tension roller 10, and is tensioned with a total force of 100 N by the tension roller 10.

As the intermediate transfer belt 8 according to the present exemplary embodiment, a 70 μm-thick endless belt is used, which is made of a polyimide resin adjusted to a volume resistivity of 1×10E10 Ω·cm by combining carbon as an electroconductive agent.

The volume resistivity of the intermediate transfer belt 8 is desirably in a range of 1×10E9 to 10E11 Ω·cm from the viewpoint of transferability. If the volume resistivity is lower than 1×10E9 Ω·cm, a transfer defect may occur due to a transfer current escaping under a high-temperature and high-humidity environment. On the other hand, if the volume resistivity is higher than 1×10E11 Ω·cm, a transfer defect may occur due to abnormal electric discharge under a low-temperature and low-humidity environment.

In this case, the volume resistivity of the intermediate transfer belt 8 can be obtained by the following measurement method. Specifically, a measurement is performed using Hiresta-UP (MCP-HT450) manufactured by Mitsubishi Chemical Corporation and a UR probe as a measurement probe under conditions where the room temperature during measurements is 23° C., the room humidity is set to 50%, an applied voltage is 250 V, and a measurement time is 10 sec.

In the present exemplary embodiment, a polyimide resin is used as a material of the intermediate transfer belt 8. However, the material of the intermediate transfer belt 8 is not limited to the polyimide resin. For example, other materials such as the following materials may be used as long as the material is a thermoplastic resin. Examples of the materials include polyester, polycarbonate, polyarylate, acrylonitrile butadiene-styrene copolymer (ABS), polyphenylene sulphide (PPS), polyvinylidene fluoride (PVdF), polyethylene naphthalate (PEN), and a mixed resin of these materials. In the present exemplary embodiment, an electron-conductive intermediate transfer belt using carbon as an electroconductive agent is used. Alternatively, for example, an electroconductive agent having an ion-conductive property may be used as the electroconductive agent. Examples of the electroconductive agent having the ion-conductive property include a multivalent metal salt and a quaternary ammonium salt. As for the quaternary ammonium salt, as a cationic portion, tetraethylammonium ion, tetrapropylammonium ion, tetraisopropylammonium ion, tetrabutyl ammonium ion, tetrapentylammonium ion, tetrahexylammonium ion, and the like may be used, and as an anionic portion, halogen ion, and fluoroalkylsulfate ion, fluoroalkylsulfite ion, fluoroalkylborate ion, which have 1 to 10 carbon atoms in a fluoroalkyl group, and the like may be used. A configuration in which a polyetheresteramide resin is mainly used and potassium perfluorobutanesulfonate or the like is also used and added to the polyetheresteramide resin may also be used.

In the present exemplary embodiment, a nickel-plated steel bar having an outer diameter of 6 mm and serving as a cored bar is used for the primary transfer roller 5. In the primary transfer roller 5, which is an elastic roller having an outer diameter of 12 mm, the cored bar is covered with a foam sponge body as an elastic layer having a thickness of 3 mm and containing acrylonitrile butadiene rubber (NBR) and epichlorohydrin rubber as main components obtained after adjusting the volume resistivity thereof to about 1×10E5 to 1×10E7 Ω·cm. The primary transfer roller 5 is brought into contact with the photosensitive drum 1 via the intermediate transfer belt 8 with a pressing force of 9.8 N, and is driven to rotate with the rotation of the intermediate transfer belt 8. When toner on the photosensitive drum 1 is primarily transferred to the intermediate transfer belt 8, a direct-current (DC) voltage (primary transfer bias) of about 1500 to 2000 V is applied to the primary transfer roller 5.

For the secondary transfer roller 11, a nickel-plated steel bar having an outer diameter of 8 mm and serving as a cored bar is used. In the secondary transfer roller 11, which is an elastic roller having an outer diameter of 18 mm, the cored bar is covered with a foam sponge body as an elastic layer having a thickness of 5 mm and containing NBR and epichlorohydrin rubber as main components obtained after adjusting the volume resistivity thereof to about 1×10E7 to 1×10E8 Ω·cm.

The secondary transfer roller 11 is brought into contact with the intermediate transfer belt 8 with a pressing force of 50 N, and is driven to rotate with the rotation of the intermediate transfer belt 8. In the present exemplary embodiment, a high-voltage power supply with a high-voltage output upper limit of 6500 V is used as a high-voltage power supply (voltage application unit) used for secondary transfer. When toner on the intermediate transfer belt 8 is secondarily transferred to the transfer material S, such as paper, a DC voltage (secondary transfer bias) of about 2500 to 6500 V is applied to the secondary transfer roller 11.

The above-described values are to be set to optimum values depending on a belt material, a roller material, a device configuration, and the like, and the values and configuration are not limited to the above-described values and configuration.

3. Image Forming Process of Image Forming Apparatus

An image forming process of the image forming apparatus 100 according to the present disclosure will be described.

During image formation, the outer peripheral surface of the rotating photosensitive drum 1 is charged to a predetermined potential of a predetermined polarity (negative polarity in the present exemplary embodiment) by the primary charging roller 2 to which a primary charging bias of a predetermined polarity (negative polarity in the present exemplary embodiment) is applied. Then, the charged surface of the photosensitive drum 1 is exposed to light based on an image signal by a laser unit 3. As a result, an electrostatic latent image (electrostatic image) is formed on the surface of the photosensitive drum 1.

This electrostatic latent image is developed (visualized) as a toner image by the developing device 4 using toner as developer. At this time, a developing bias of a predetermined polarity (negative polarity in the present exemplary embodiment) is applied to the developing roller 41. In the present exemplary embodiment, the toner image is formed on the photosensitive drum 1 by image exposure and reversal development. Specifically, the toner image is formed by toner charged to the same polarity as the charging polarity of the photosensitive drum 1 being caused to adhere to an exposed portion on the photosensitive drum 1 where an absolute value of the potential is lowered due to exposure after a uniform charging process. In the present exemplary embodiment, toner used for development is charged to the negative polarity. In other words, the charging polarity (normal charging polarity) of toner during the development is the negative polarity.

The toner image formed on the rotating photosensitive drum 1 as described above is transferred (primarily transferred) to the intermediate transfer belt 8 that is rotating at substantially the same speed as the photosensitive drum 1 and is in contact with the photosensitive drum 1 at the primary transfer portion N1. At this time, a primary transfer bias of a polarity (positive polarity in the present exemplary embodiment) opposite to the charging polarity of toner during the development is applied to the primary transfer roller 5 from a primary transfer bias power supply (high-voltage power supply, voltage application unit) 51 serving as a primary transfer bias application unit.

A target current value with which optimum image formation can be achieved is preliminarily set for the primary transfer bias, and a transfer voltage is controlled by the high-voltage control unit (voltage control unit) so that a predetermined current (target current) is obtained before the toner image formed on the photosensitive drum 1 reaches the primary transfer portion N1. In a series of image forming operation processes, a period from when the rotation of the photosensitive drum 1 is started to when the toner image on the photosensitive drum 1 reaches the transfer portion and the toner image is about to be transferred to the intermediate transfer belt 8 is defined as a pre-rotation. A transfer voltage control performed during the pre-rotation is referred to as auto transfer voltage control (ATVC).

ATVC is an operation for performing a constant-current control of a transfer portion with a preset value with respect to a non-image portion on the photosensitive member in a pre-multi-rotation at start-up on a date when the image forming apparatus 100 is used, or in a pre-rotation before image formation, for example, and detecting a variation in the resistance of the transfer portion based on a variation of a generated voltage value at the time. During image formation, a constant-voltage control is performed based on a result of performing arithmetic processing on the generated voltage value. This prevents an overcurrent from flowing to the photosensitive member from the primary transfer portion N1, for example, in the primary transfer, and an image failure known as "memory" of the photosensitive member can be prevented from being generated. Further, for example, during image formation, an appropriate bias can be applied, which makes it possible to stably output a satisfactory transfer image.

During formation of a full-color image, toner images formed on photosensitive drums 1Y, 1M, 1C, and 1K of the first, second, third, and fourth image forming portions PY, PM, PC, and PK are transferred to the intermediate transfer belt 8 in such a manner that the toner images are sequentially superimposed. In a state where the toner images of the four colors are superimposed, the toner images are conveyed to the secondary transfer portion N2 by the rotation of the intermediate transfer belt 8.

On the other hand, the transfer material S, such as a recording sheet, delivered from a feeding/conveyance device 12 is conveyed to the secondary transfer portion N2 by a registration roller pair 16. The feeding/conveyance device 12 includes a feeding/conveyance roller 14 for delivering the transfer material S from the inside of a cassette 13 that stores the transfer material S, and a conveyance roller pair 15 for conveying the delivered transfer material S. The transfer material S conveyed from the feeding/conveyance device 12 is further conveyed to the secondary transfer portion N2 in synchronization with the toner images on the intermediate transfer belt 8 by the registration roller pair 16.

At the secondary transfer portion N2, the toner images on the intermediate transfer belt 8 are transferred (secondarily transferred) to the transfer material S conveyed by being nipped between the intermediate transfer belt 8 and the secondary transfer roller 11. At this time, a secondary transfer bias of a polarity (positive polarity in the present exemplary embodiment) opposite to the charging polarity of toner during development is applied to the secondary transfer roller 11 from a secondary transfer bias power supply (high-voltage power supply, voltage application unit) 53 serving as a secondary transfer bias application unit.

As in the primary transfer bias control, a target current value with which optimum image formation can be achieved is preliminarily set for the secondary transfer bias. In a series of image forming operation processes, a period from when the rotation of the photosensitive drum 1 is started to when the toner images reach the secondary transfer portion N2 the toner images are about to be transferred to the transfer material S is defined as a pre-rotation in second transfer. During the pre-rotation in the secondary transfer, a ATVC at the secondary transfer portion is performed so that the high-voltage control unit can control the transfer voltage to obtain the target current during image formation.

The transfer material S to which the toner images are transferred is conveyed to a fixing device 17 serving as a fixing unit. The transfer material S is heated and pressed while being nipped and conveyed by a fixing film 18 and a pressure roller 19, which are included in the fixing device 17, so that the toner images are fixed onto a surface of the transfer material S.

The transfer material S onto which the toner images are fixed is discharged to the outside of the image forming apparatus 100 by a discharge roller pair 20. Residual toner (primary transfer residual toner) remaining on the surface of the photosensitive drum 1 after a primary transfer process is cleaned by the drum cleaner 6. Specifically, the primary transfer residual toner is scraped off from the surface of the rotating photosensitive drum 1 with the drum cleaning blade 61, which is disposed in contact with the photosensitive drum 1, and the toner is collected in the waste toner container 62.

4. Life Detection Unit

Next, a life detection unit used in the present exemplary embodiment will be described. A case where the life of the secondary transfer roller 11 is determined will now be described.

In the present exemplary embodiment, during image formation in the secondary transfer described above, the life detection unit detects a variation in the transfer voltage due to long-time operation calculated by ATVC to thereby determine the life of the secondary transfer roller 11.

In the present exemplary embodiment, the life detection unit determines the life of the secondary transfer roller 11 in a case where a toner image formed by superimposing a plurality of toner colors is transferred from the intermediate transfer belt 8 using the secondary transfer roller 11. However, the life detection unit can also determine the life thereof in other configurations. For example, the life detection unit can determine the life thereof when the toner image formed by superimposing a plurality of toner colors is transferred not from the intermediate transfer belt 8, but from the photosensitive drum 1.

Specifically, an ATVC is performed, and the transfer voltage calculated by ATVC is stored in a data storage unit (memory) on the control board 25 in the image forming apparatus 100. At the same time, image printing information obtained during image development is also stored when an image job is received. In the present exemplary embodiment, information about a maximum amount of toner in an image to be printed is obtained as the image printing information. In this case, a single-color solid image of each of Y, M, C, and K colors of toner is defined as 100%, and a solid image of a secondary color, such as R that is a mixed color of Y and M, G that is a mixed color of Y and C, and B that is a mixed color of M and C, as a mixed color of a plurality of colors is defined as 200%. An intermediate color between a single color and a secondary color is set in a range of 100 to 200%. The amount of toner in a portion with the largest amount of toner in an image to be printed is defined as the maximum amount of toner. Information about the maximum amount of toner is obtained and stored in the memory as image information together with a result of ATVC obtained for each job.

Figure 2:
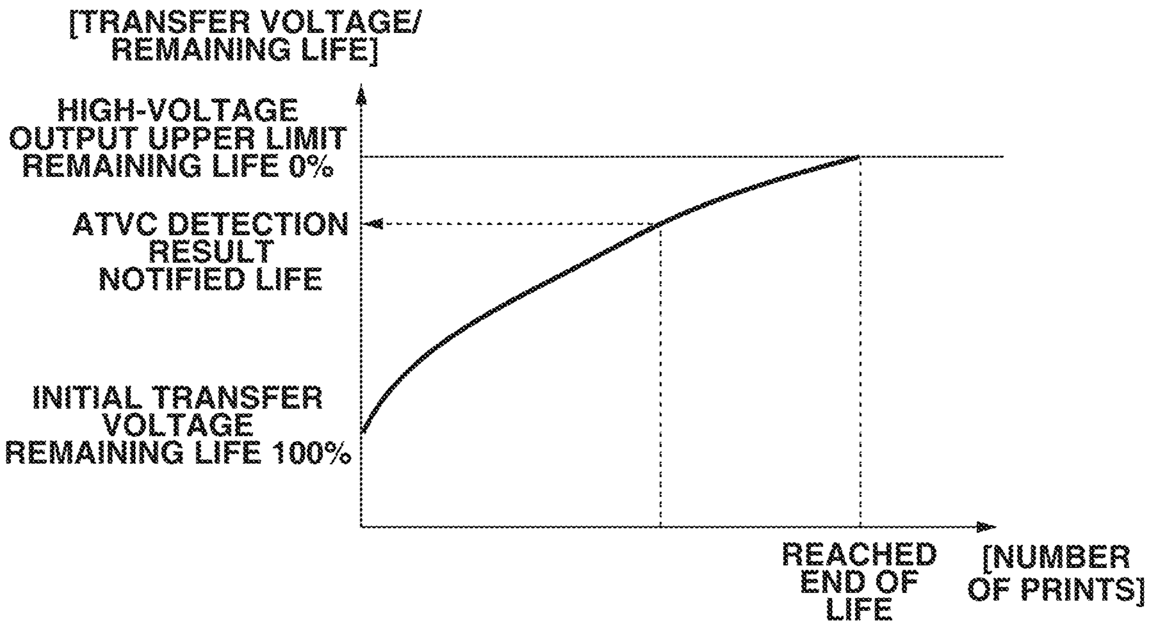
FIG. 2 is a schematic graph illustrating a relationship between the number of prints and a transfer voltage calculated based on a state of an increase in an auto transfer voltage control (ATVC) detection result calculated by ATVC in the image forming apparatus according to the first exemplary embodiment.

FIG. 2 is a schematic graph illustrating a relationship between the number of prints and a transfer voltage calculated based on a state of an increase in the ATVC detection result (transfer voltage) calculated by ATVC in the image forming apparatus 100 according to the present exemplary embodiment. The secondary transfer roller 11 exhibits a behavior in which a resistance value increases over a period of time of use. In other words, the secondary transfer roller 11 exhibits a behavior in which the ATVC detection result (transfer voltage) calculated by ATVC increases with the long-time operation. A required transfer voltage increases as the number of prints increases, and when the required transfer voltage exceeds an upper limit of high-voltage output of the image forming apparatus 100, the transfer voltage required for transfer cannot be applied. The upper limit of the high-voltage output is defined as one of the conditions for determining that the end of the life of the secondary transfer roller 11 is reached. The life of the secondary transfer roller 11 is predicted based on an increase in the transfer voltage during ATVC, and the detection result indicating that the upper limit of the high-voltage output is reached is also used to determine the life of the secondary transfer roller 11. Then, a warning that the end of the life thereof is about to be reached is issued to transmit a notification to a user to prompt the user to replace the secondary transfer roller 11 with a new one. Specifically, in the end-of-life notification, the upper limit of the high-voltage output is compared with the current ATVC detection result (transfer voltage) to thereby calculate the life in percentage. The remaining life of a new secondary transfer roller is defined as 100%, and the ATVC detection result (transfer voltage) detected when a new secondary transfer roller is used is defined as an initial transfer voltage. The remaining life of the secondary transfer roller when the ATVC detection result (transfer voltage) has reached the upper limit of the high-voltage output is defined as 0%, i.e., the end of life is reached, and the percentage of the remaining life is notified every time the ATVC detection result (transfer voltage) is obtained.

In the present exemplary embodiment, a configuration in which a notification about the remaining life expressed as a percentage is transmitted as life information is described. However, any configuration other than the configuration in which the notification about the remaining life expressed as a percentage is transmitted as the life information may be used. For example, a timing of requesting replacement of the secondary transfer roller 11 with a new one, or a timing of transmitting a notification that the end of the life is about to be reached may be used as the life information.

Figure 3:
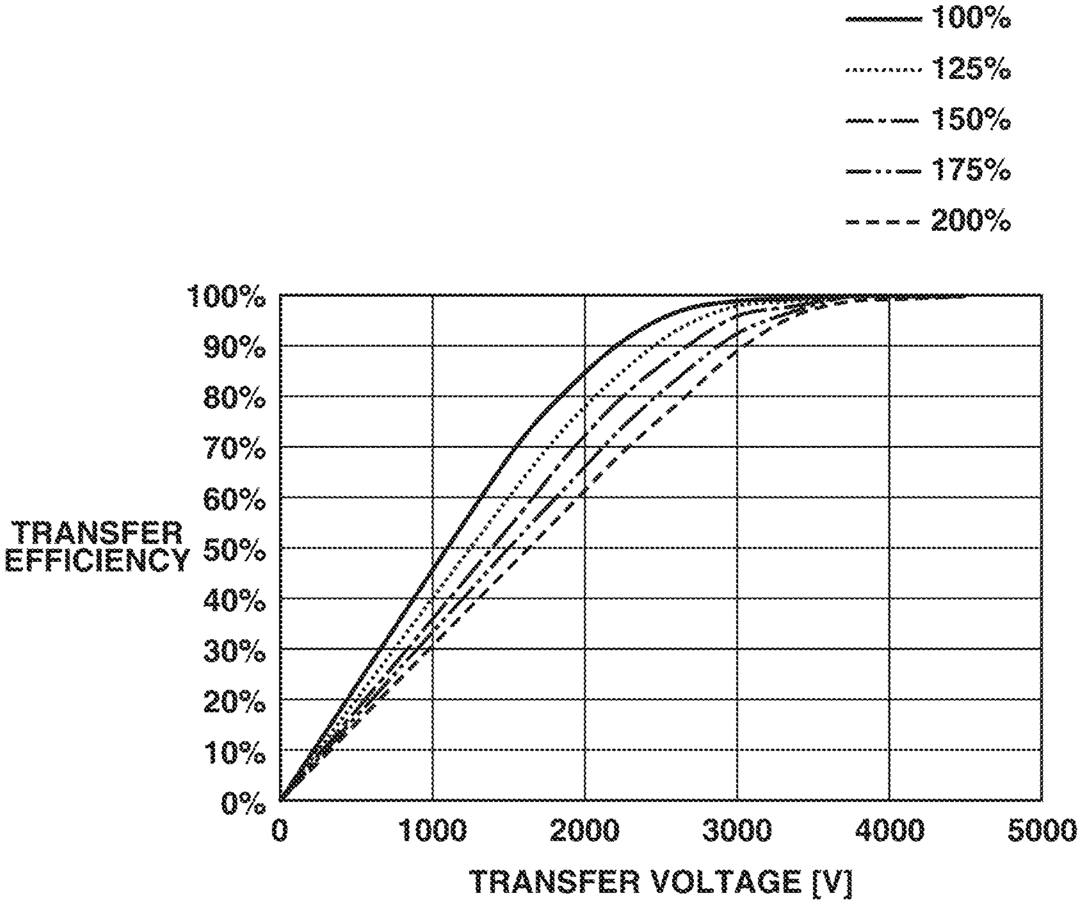
FIG. 3 is a graph illustrating a relationship between a transfer voltage and a transfer efficiency rate for each amount of toner.

FIG. 3 is a graph illustrating a relationship between a transfer voltage and a transfer efficiency rate for each amount of toner in an image to be printed.

The graph illustrated in FIG. 3 is obtained by forming images by varying the maximum amount of toner in a range of 100% to 200% in increments of 25% and by plotting the relationship between the transfer voltage and the transfer efficiency rate for each case.

The term "transfer efficiency rate" as used herein refers to an index for evaluating the transferability by calculating a ratio of change between a toner weight before secondary transfer and a toner weight after the secondary transfer per predetermined area. The weight of toner (before transfer) on the intermediate transfer belt 8 after the primary transfer and before the secondary transfer and the weight of toner (before transfer) on the transfer member after the secondary transfer and before fixation are measured, and the transfer efficiency rate is calculated based on the ratio between the toner weights.

Specifically, the transfer efficiency rate [%] is calculated by the following formula (1).

$$(\text{Toner weight after transfer})/(\text{Toner weight before transfer})\times 100[\%] \qquad (1)$$

The result indicates that a minimum required voltage at which the transfer efficiency rate is 100% varies for each maximum amount of toner. More specifically, the minimum required voltage increases as the maximum amount of toner increases.

The result illustrated in FIG. 3 is an example in a case where a new transfer roller is used as the transfer roller. In this case, when the amount of toner is 100%, the transfer voltage at which the transfer efficiency rate is 100% is about 3100 V. When the maximum amount of toner is 200%, the transfer voltage at which the transfer efficiency rate is 100% is about 3800 V. This indicates that the minimum transfer voltage at which the transfer efficiency rate is 100% varies for each maximum amount of toner.

FIG. 4 is a table illustrating a relationship between the transfer voltage required for each maximum amount of toner illustrated in FIG. 3 and a correction coefficient for each maximum amount of toner.

In the table, a transfer voltage required for transferring an image with a maximum toner amount of 200% in a solid image of what is called R, G, and B secondary colors, i.e., a conventional ATVC detection result (transfer voltage), is set to a correction coefficient "1" indicating there is no correction using the amount of toner. Further, a ratio between the required transfer voltage for each amount of toner and the ATVC detection result (transfer voltage) is calculated, and the calculated ratio is set as the correction coefficient.

While the correction may be performed using the correction coefficient for each image in the correction coefficient table illustrated in FIG. 4, in the present exemplary embodiment, a correction formula calculated based on the relationship between the amount of toner and the correction coefficient illustrated in FIG. 4 is obtained, and the correction is performed by the following correction formula (2).

$$Y=0.0019X+0.6211 \qquad (2)$$

In the correction formula (2), "X" represents information about the amount of toner [%], and "Y" represents a correction coefficient $\alpha$.

Figure 5:
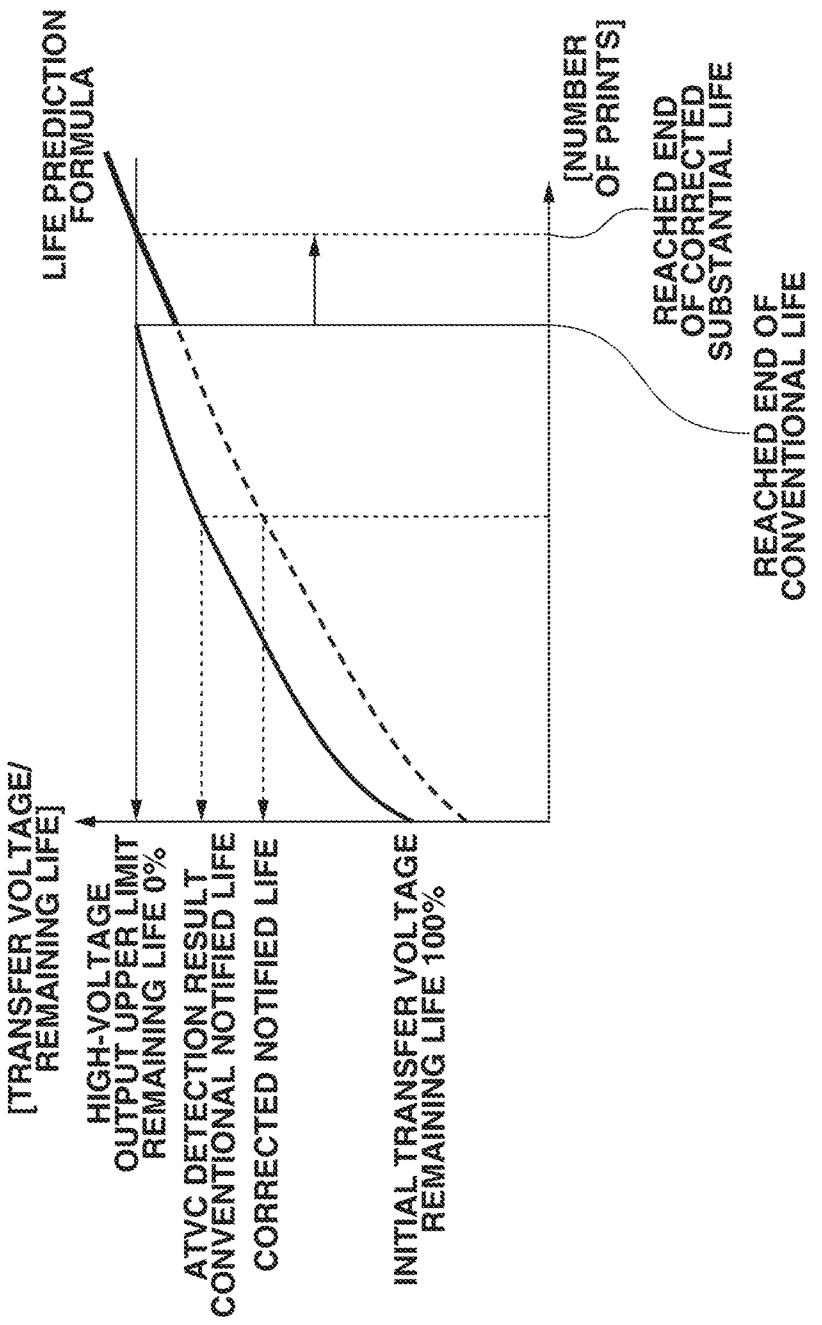
FIG. 5 is a graph illustrating a voltage correction and a life based on the amount of toner according to the first exemplary embodiment.

FIG. 5 is a graph illustrating the conventional ATVC detection result (transfer voltage) and a result of correcting the ATVC detection result (transfer voltage) using the correction coefficient depending on the amount of toner in each image during image formation using the correction formula (2). The result of correcting the ATVC detection result (transfer voltage) is estimated data used for detecting the life of a transfer member.

As in FIG. 2, a solid line in FIG. 5 represents the conventional ATVC detection result (transfer voltage) before correction, and a dotted line in FIG. 5 represents the result of correcting the ATVC detection result (transfer voltage) to a required voltage based on the information about the amount of toner in each image to be printed. These pieces of data are estimated data.

In the present exemplary embodiment, as illustrated in FIG. 4, in the case of transferring an image with the toner amount of 200% corresponding to the secondary color, no correction is performed, and thus the correction coefficient is "1". In the case of transferring an image with the toner amount of 100% corresponding to the single color, the correction coefficient is "0.81". Depending on images, the correction coefficient takes a value in a range of "0.81" to "1", and the transfer voltage is corrected using the corresponding correction coefficient. In the example in FIG. 5, estimated values of the voltage when images with the toner amount of 100% to 125% on average are used as images during actual long-time operation.

In the example in FIG. 5, the correction of the ATVC detection result (transfer voltage) and the life prediction are described in general. In practice, however, in the present exemplary embodiment, the ATVC detection result (transfer voltage) and the information about the amount of toner are obtained every time printing is performed, and the required voltage is estimated from the ATVC detection result (transfer voltage) based on the obtained data. Then, a regression analysis is performed on the relationship between an obtained required voltage value and the number of prints to obtain a regression formula, thereby the substantial life of the transfer member is obtained. This operation will be described in more detail below in the description of exchange of data between an engine and a server.

In this example, the regression formula is obtained by a regression analysis to thereby obtain the substantial life of the transfer member. Alternatively, the life of the transfer member may be obtained by any other statistical method. For example, required voltage values may be averaged at every predetermined timing, for example, for every 1000 sheets, and the life of the transfer member may be obtained based on a ratio between a high-voltage upper limit and an average voltage, or the life of the transfer member may be obtained using a moving average for each predetermined section.

As is obvious from the above, even in a case where the upper limit of the high-voltage performance is reached and the end of the life is reached, or the remaining life is 0%, in the conventional ATVC detection result (transfer voltage) as indicated by the solid line in FIG. 5, a sufficient voltage required for transfer can still be applied in the image forming apparatus 100 even at a point conventionally regarded as the end of life, from the viewpoint of a substantial required voltage value based on the image information as indicated by the dotted line in FIG. 5 according to the present exemplary embodiment. In the present exemplary embodiment, it is set that when the substantial required voltage value based on the image information reaches the upper limit of the high-voltage performance, the end of life is reached, and the remaining life is "0%". By detecting the life as described above, an end-of-life notification timing, which is a timing when the high-voltage output upper limit is reached, is delayed corresponding to the corrected and estimated transfer voltage. In other words, the life of the transfer member is appropriately detected based on the image information about an image to be actually printed by the user, thereby it becomes possible to appropriately notify the user of a time for replacement of the transfer member with a new one.

In practice, after the upper limit of the high-voltage performance is reached in the conventional ATVC detection result (transfer voltage) as indicated by the solid line in FIG. 5, the ATVC detection result (transfer voltage) is maintained at the high-voltage upper limit. Accordingly, after the ATVC detection result has reached the high-voltage upper limit, the transfer member exhibits a behavior in which the substantial required voltage value corrected and calculated based on the information about the amount of toner is also maintained. Thus, in the present exemplary embodiment, when the ATVC detection result (transfer voltage) has reached the upper limit of the high-voltage output (when the number of prints illustrated in FIG. 5 has reached the number indicated as "reached end of conventional life"), an update of a remaining life prediction formula obtained in advance by a regression analysis or the like is suspended. Then, a final life prediction formula is obtained using the result of required voltage values obtained up to that time, and the life is predicted as indicated by a thick solid line in FIG. 5. A subsequent life prediction process is performed assuming that a timing when the required voltage value after the correction reaches the high-voltage upper limit is set as a timing when the end of life is reached, or when the remaining life is 0%, using the final life prediction formula.

The method in which the ATVC detection result (transfer voltage) is corrected based on the image information and the life is calculated and obtained based on a transition of the transfer voltage after the correction has been described above. However, the resistance value may be detected from the ATVC detection result (transfer voltage) and the detected current flowing at that time, and the detected resistance value may be corrected based on the image information. Then, the life of the transfer member may be calculated and obtained based on a transition of an increase of the resistance value after the correction (hereinafter defined as a "substantial resistance value").

In this case, an upper-limit resistance value is preliminarily set as the upper limit of the resistance value based on the voltage and the detected current when the upper limit of the high-voltage output is reached, and the life is calculated based on a ratio of the resistance value at the time of detection to the upper-limit resistance value. Consequently, the life can be calculated as in the above-described configuration using the transfer voltage.

Specifically, assume herein that the remaining life of a new secondary transfer roller is 100% and the calculated resistance value of the new secondary transfer roller is set as an initial resistance value. In addition, a configuration in which the remaining life is defined such that the remaining life is 0%, or the end of the life is reached, when the detected resistance value reaches the upper-limit resistance value, and the percentage of the remaining life is notified every time the resistance value is detected is employed.

As the transition of an increase of the resistance value, after the upper-limit resistance value is reached, the high-voltage output reaches the upper limit and is maintained at the upper limit. In this case, the current that flows gradually decreases, so that the calculated resistance value continuously increases as indicated by the solid line.

Accordingly, in this case, the correction based on the image information is continued even after the resistance value before correction has reached the upper-limit resistance value, and it is determined that the end of the life is reached when the substantial resistance value after the correction has reached the upper-limit resistance value.

Figure 6:
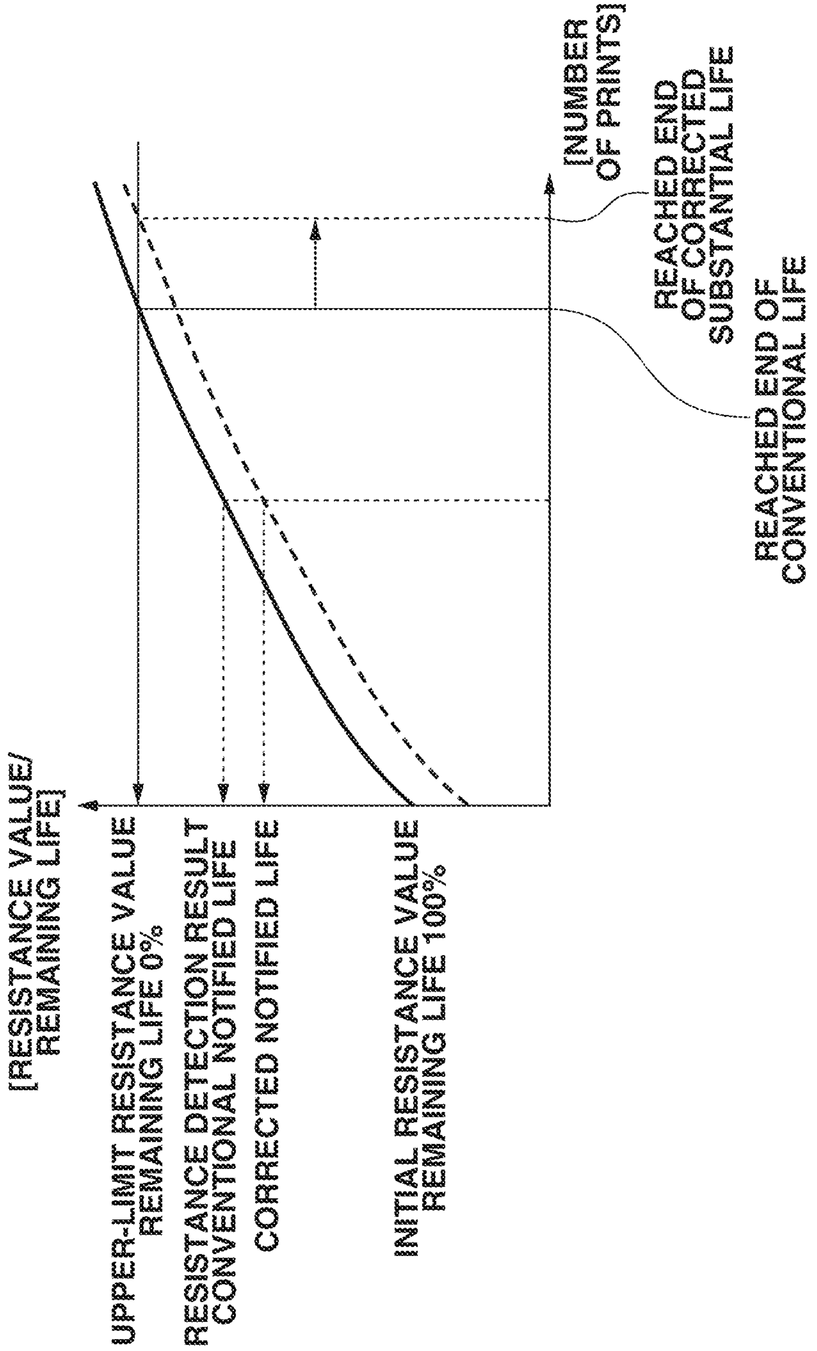
FIG. 6 is a graph illustrating a resistance correction and a life based on the amount of toner according to the first exemplary embodiment.

FIG. 6 is a schematic graph illustrating a relationship among the number of prints, a resistance value, and a remaining life. In FIG. 6, a solid line represents a transition of each of the resistance value and the remaining life before correction, and a dotted line represents a transition of each of the substantial resistance value and the remaining life after the correction.

In the present exemplary embodiment, as in the case of estimating the required voltage by correcting the ATVC detection result (transfer voltage) based on the image information, the resistance detection result before correction and information about the amount of toner are obtained, and the resistance detection result is corrected based on the obtained data, thereby the substantial life is obtained from the detection result of the substantial resistance value after the correction. Specifically, in the present exemplary embodiment, the image forming apparatus 100 obtains the ATVC detection result (transfer voltage), the detected current, and information about the toner amount every time printing is performed. Then, the image forming apparatus 100 calculates, corrects, and estimates the resistance value based on the obtained data, and obtains a regression formula by performing a regression analysis on the relationship between the detection result of the substantial resistance value after the correction and the number of prints, thereby obtaining the substantial life.

Alternatively, as in the case of predicting the life by correcting the ATVC detection result (transfer voltage) and estimating the required voltage value as described above with reference to FIG. 5, when the resistance detection result before correction has reached the upper-limit resistance value, an update of the life prediction formula obtained by a regression analysis or the like based on the detection result of the substantial resistance value after the correction may be suspended. Then, the final life prediction formula may be obtained using the result of substantial resistance values obtained up to that time. A subsequent life prediction process may be performed assuming that a timing when the substantial resistance value after the correction reaches the upper-limit resistance value is set as a timing when the end of life is reached, or when the remaining life is 0%, using the final life prediction formula.

According to this method, in a case where the detected current gradually decreases after the high-voltage output has reached the upper limit, effects of the detected current during calculation of the resistance value can be eliminated.

A method in which the ATVC detection result (transfer voltage) is corrected based on the image information and the life is calculated and obtained based on a transition of the required voltage value after the correction will be described in detail below.

Figure 7:
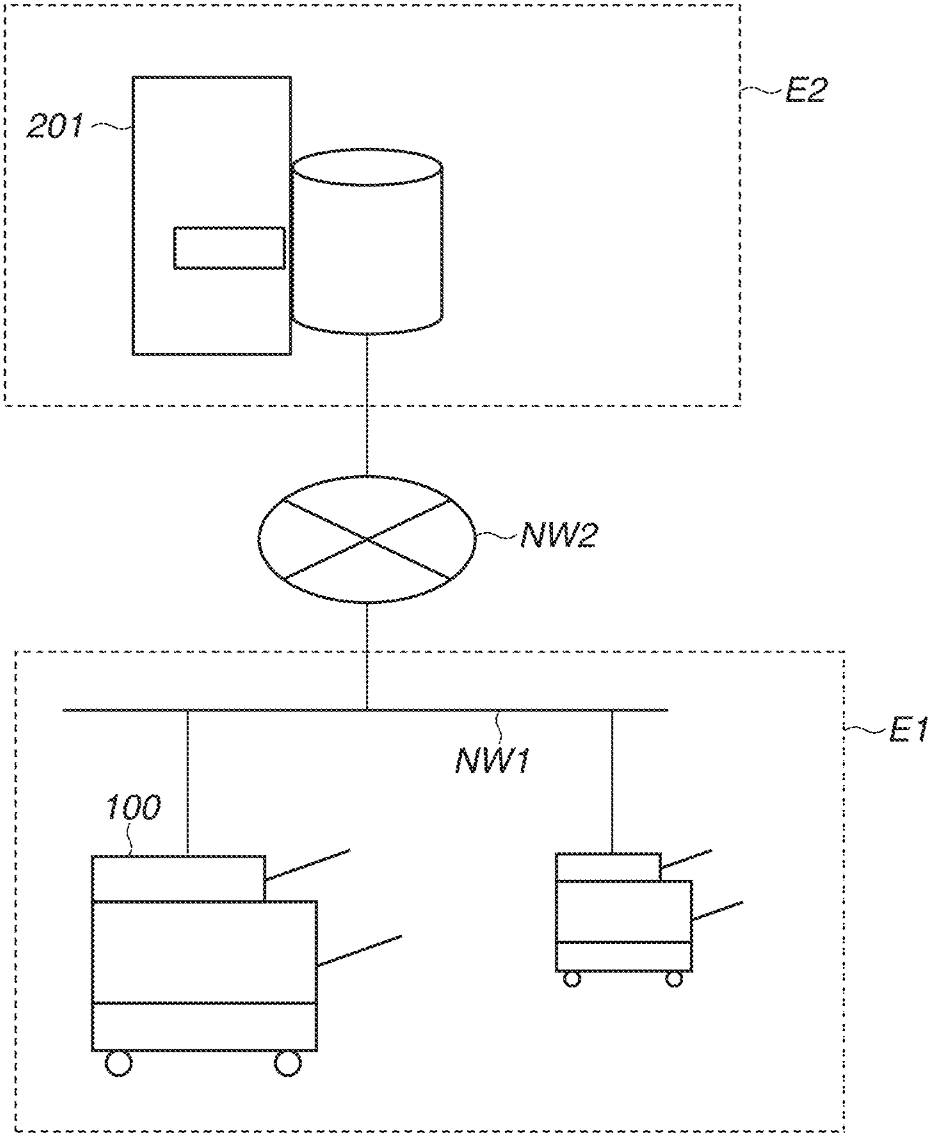
FIG. 7 is a schematic diagram illustrating a network connection according to the first exemplary embodiment.

FIG. 7 illustrates an example of a network configuration of the image forming apparatus 100.

The image forming apparatus 100 is installed in a user environment E1 in which the user is present, and is connected to a local network NW1 that may be, for example, a local area network (LAN). A server 201 is installed in a remote environment E2. The remote environment E2 is connected to the local network NW1 via an external network NW2. The external network NW2 may be, for example, the Internet or a virtual private network (VPN). The local network NW1 and the external network NW2 may each include, for example, any number of network devices of any type, such as a router, a switch, a gateway, a wireless access point, and a base station.

In the user environment E1, the user uses the image forming apparatus 100. The image forming apparatus 100 prints any image through the image forming process as described above. In the image forming apparatus 100, the above-described ATVC has been performed before the image forming process, and the transfer voltage to be applied during the image formation has been calculated.

At the same time, in the present exemplary embodiment, the image forming apparatus 100 also obtains information about the amount of toner as printing ratio information about the printed image and transmits the obtained information together with the ATVC result to the server 201.

An obtaining unit of the server 201 obtains the data output from the image forming apparatus 100. This data is data based on a correction value obtained by correcting the voltage to be applied to the transfer member based on the ATVC result, and data on prediction of the life of the transfer member. In the server 201, a required voltage value is calculated based on the data. Specifically, the required voltage value can be obtained based on the obtained transfer voltage and the information about the amount of toner being multiplied by the above-described correction coefficient, and the calculated required voltage value is stored.

In this case, the transfer voltage obtained by ATVC using the above-described voltage correction formula (2), which is calculated based on the relationship between the voltage and the information about the amount of toner experimentally obtained in advance, is converted into the required voltage value that is the substantial required transfer voltage.

The required voltage value thus obtained is stored in the server 201, and the substantial life is calculated on the server 201 based on the transition of an increase of the required voltage value obtained by performing statistical processing, such as moving average and regression calculation.

The life prediction result calculated by the server 201 is transmitted from the server 201 to the image forming apparatus 100 via a network. The life prediction result may be, for example, a display of the percentage of the remaining life, or a warning that the end of the life is about to be reached. Thus, data on the prediction of the life of the transfer member is transmitted from a transmission unit of the server 201 to the image forming apparatus 100. For example, the life prediction result is displayed on an operation panel (notification unit) installed in the image forming apparatus 100, thereby a notification about the life is transmitted to the user. Alternatively, the notification about the life may be transmitted to a monitoring tool to be described below.

The above-described server (management server) 201 used in this case may be implemented as an application server, a database server, or a cloud server using, for example, a high-performance general-purpose computer.

In the case of performing an analysis using an external storage unit or an external arithmetic unit connected via the network as described above, a larger amount of data can be used without constraints on the performance and capacity of a CPU incorporated in a main body of the image forming apparatus 100. An analysis using statistical processing such as a complicated regression calculation can be performed, which leads to an improvement in detection accuracy.

The functions of the server 201 may be provided by a single device, or by a plurality of physically separated devices operating in conjunction with each other.

Figure 8:
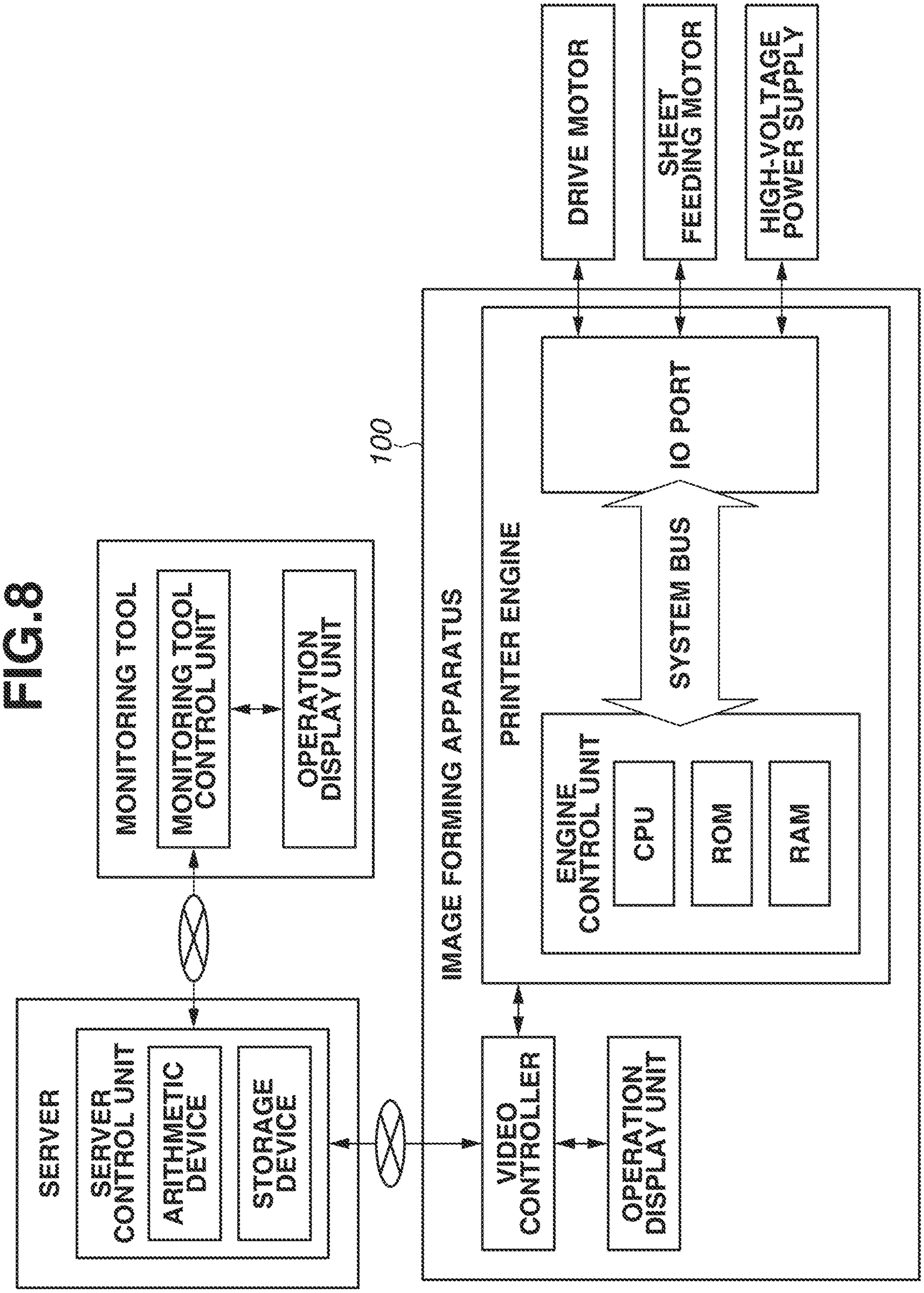
FIG. 8 is a block diagram illustrating a hardware configuration according to the first exemplary embodiment.

FIG. 8 is a block diagram illustrating a hardware configuration according to the present exemplary embodiment. The hardware configuration according to the present exemplary embodiment includes the image forming apparatus 100, a server, and a monitoring tool as illustrated in FIG. 8. These components are connected via a LAN or the Internet.

The image forming apparatus 100 includes a video controller, an operation display unit (display unit), and a printer engine. The operation display unit included in the image forming apparatus 100 includes an operation panel, operation buttons, and the like (not illustrated). The operation display unit (notification unit) notifies the user of information about the life of the transfer member. The notification may be provided not only by displaying, but also by outputting a sound from a speaker. The video controller transmits print data (image data) and a print instruction that are transmitted from a host computer (not illustrated) to the printer engine. The printer engine includes an engine control unit, which includes a CPU, a read-only memory (ROM), and a random access memory (RAM), a system bus, and input/output (IO) ports. The CPU loads programs and various data into the ROM, and executes programs using the RAM as a work area. The above-described components can access the IO ports via the bidirectionally accessible system bus. Each of the IO ports is connected to a drive motor, a sheet feeding motor, a high-voltage power supply, and the like. The CPU controls these devices via each of the IO ports. The devices to be connected are not limited to the devices described in the present exemplary embodiment.

The server includes a server control unit including an arithmetic device and a storage device, and is connected to the image forming apparatus 100 and the monitoring tool via a bidirectionally accessible network. The arithmetic device executes programs stored in the storage device and reads and writes various data. A CPU or a graphics processing unit (GPU) may be directly allocated as the arithmetic device, and a RAM, a hard disk device (HDD), a solid-state drive (SSD), or the like may be directly allocated as the storage device, or a virtual environment such as a virtual machine may be allocated. The server control unit can exchange information with the engine control unit via the video controller.

The monitoring tool includes a monitoring tool control unit configured to receive information from the server control unit, and an operation display unit configured to display the received information. The operation display unit included in the monitoring tool includes a display, a keyboard, and a mouse (not illustrated). A form of the monitoring tool is an information processing apparatus, which is not limited to a personal computer or a server, but may also be a virtual environment such as a virtual machine, or a tablet terminal.

These components are connected via a network, and the image forming apparatus 100 and the monitoring tool may communicate with each other without using the server.

An operation of each of the engine control unit, the server control unit, and the monitoring tool according to the present exemplary embodiment will be described with reference to a flowchart illustrated in FIG. 9.

Figure 9:
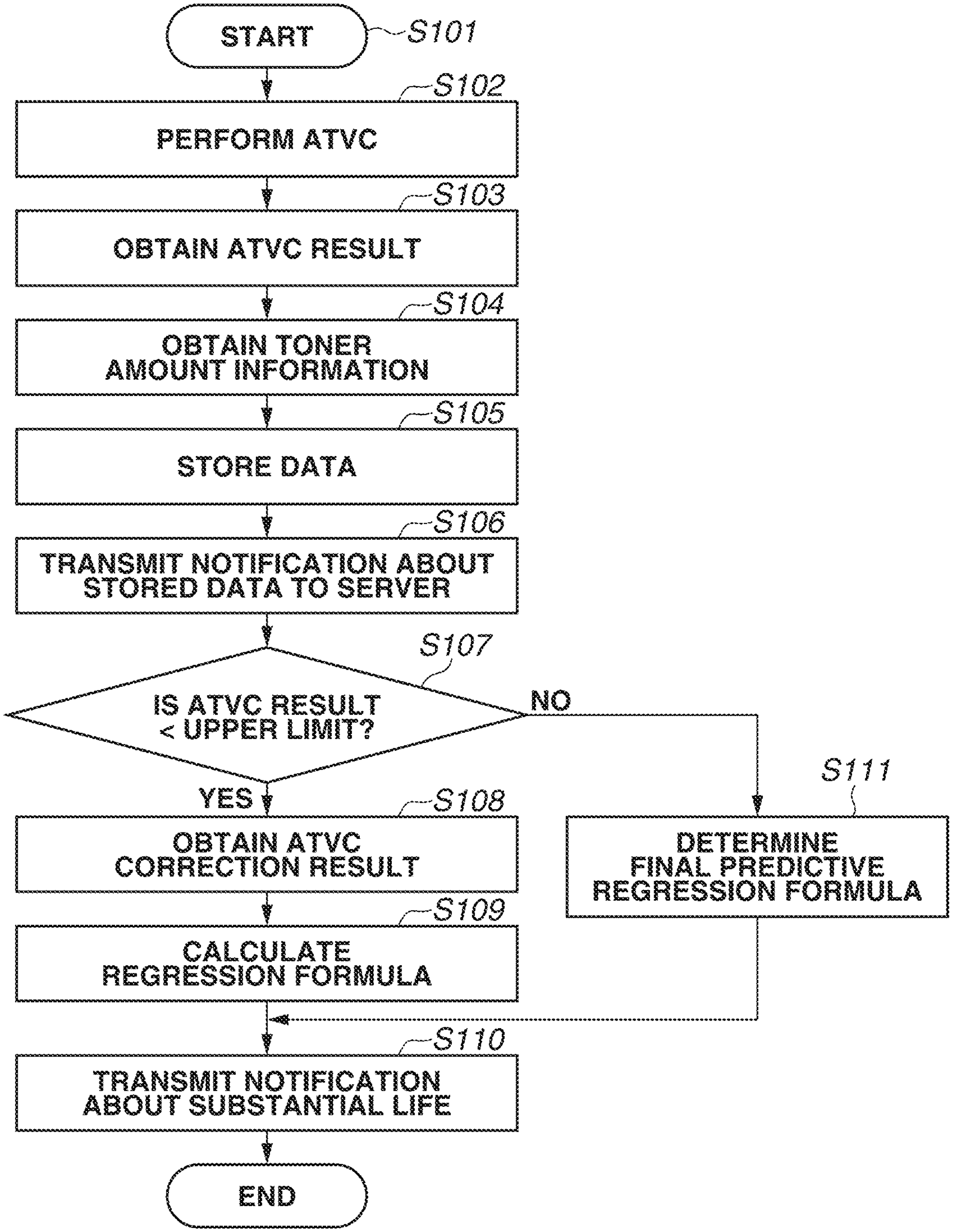
FIG. 9 is a flowchart illustrating an operation according to the first exemplary embodiment.

The operation in the flowchart illustrated in FIG. 9 is started when a print instruction is received by the printer engine. Upon receiving the print instruction, in step S101, the engine control unit starts an image forming operation. In step S102, the high-voltage control unit starts ATVC. In step S103, the high-voltage control unit performs ATVC on a target current depending on print conditions to obtain an applied voltage result as the obtained ATVC result.

Next, in step S104, an image information obtaining unit (obtaining unit, CPU 26) obtains information about the amount of toner. In step S105, the obtained ATVC result and the result of obtaining the information about the amount of toner are stored in the RAM. In step S106, a notification about the data obtained and stored is transmitted to the server control unit. Next, in step S107, it is determined whether the applied voltage result that is the ATVC result obtained in step S103 has reached the upper limit of the high-voltage output. If the applied voltage result has not reached the upper limit of the high-voltage output (YES in step S107), the processing proceeds to step S108, and the control unit (CPU 26, output unit, transmission unit) of the image forming apparatus 100 transmits a notification to the server. In step S108, the image forming apparatus 100 obtains the required voltage value that is the substantial transfer voltage for the server to calculate the substantial life based on the stored required voltage value or the resistance value calculation result and the result of obtaining the information about the amount of toner. In step S109, the required voltage value obtained in step S108 is transmitted to the server, and the arithmetic device included in the server control unit of the server performs a regression calculation based on the required voltage value. In step S110, the arithmetic device calculates the substantial life based on a ratio between a calculation result and the upper limit of the high-voltage output, and the server transmits a notification about a calculation result of the life to the monitoring tool. A notification timing is changed depending on the substantial life calculation result. The server may transmit the calculation result to the image forming apparatus 100, a reception unit of the image forming apparatus 100 may receive the result, and the output unit of the image forming apparatus 100 may output the result to the operation panel included in the image forming apparatus 100.

If the applied voltage result that is the ATVC result has reached the upper limit of the high-voltage output (NO in step S107), the processing proceeds to step S111. In step S111, the server determines the regression formula obtained immediately before the upper limit of the high-voltage output is reached to be the final predictive regression formula, without obtaining the required voltage value by the image forming apparatus 100 and without calculating the regression formula by the server. The determined final predictive regression formula is used for the subsequent substantial life prediction.

As in the present exemplary embodiment, since an analysis by calculation, regression, or the like can be performed based on a large amount of data on an external server, it is possible to accurately transmit a notification about the substantial life under conditions suitable for a use situation of the user.

A second exemplary embodiment illustrates an example where the substantial life is predicted in an image forming apparatus 100 not via an external server.

A configuration according to the second exemplary embodiment is advantageous in that the substantial life can be calculated even in a main body that is not connected to the server.

As in the first exemplary embodiment, during image formation in the secondary transfer described above, the ATVC detection result (transfer voltage) is corrected based on the transfer voltage calculated by ATVC and the amount of toner in each image, and a variation in the correction value is detected to thereby determine the life of the secondary transfer roller 11.

In the first exemplary embodiment, the result can be calculated and analyzed by the external server, which makes it possible to predict the life without imposing any particular constraint on data. In the second exemplary embodiment, the life is calculated using the data storage unit (memory) and the CPU in the main body of the image forming apparatus 100. Accordingly, the life is calculated after effective data is extracted from a large amount of data so as to reduce a processing load.

Specifically, the detection result of the transfer voltage control (ATVC) performed at each timing that satisfies a predetermined condition is stored in the data storage unit (memory) in the image forming apparatus 100, and the life is predicted based on a temporal change of the transfer voltage with respect to the number of prints. A timing when the operation is suspended for eight hours or longer after an end of a job (after a lapse of a predetermined period), i.e., a timing when the transfer roller is in a cold state, is set as the timing that satisfies the predetermined condition. It is known that the resistance value of a transfer roller varies due to a temperature rise or the like of a member during energization.

The transfer roller used in the present exemplary embodiment exhibits such a characteristic that the resistance value is highest in what is called the cold state in which the effect of a temperature rise during energization is small, and thus the detection result of ATVC performed in the cold state is used for the life prediction. The extraction of the detection result of ATVC performed at a predetermined timing as described above enables the image forming apparatus 100 to predict the life relatively stably even when it is difficult to calculate the regression formula based on a large amount of data to predict the life by using the server as in the first exemplary embodiment. In the case of using the configuration according to the present exemplary embodiment, the period of eight hours or longer after the end of a job is set as the time for allowing the transfer roller to be cooled. However, an appropriate period can be set for each configuration because the time required for the transfer roller to be cooled varies depending on the configuration, material, dimensions, and the like of a member used for the image forming apparatus 100.

Figure 10:
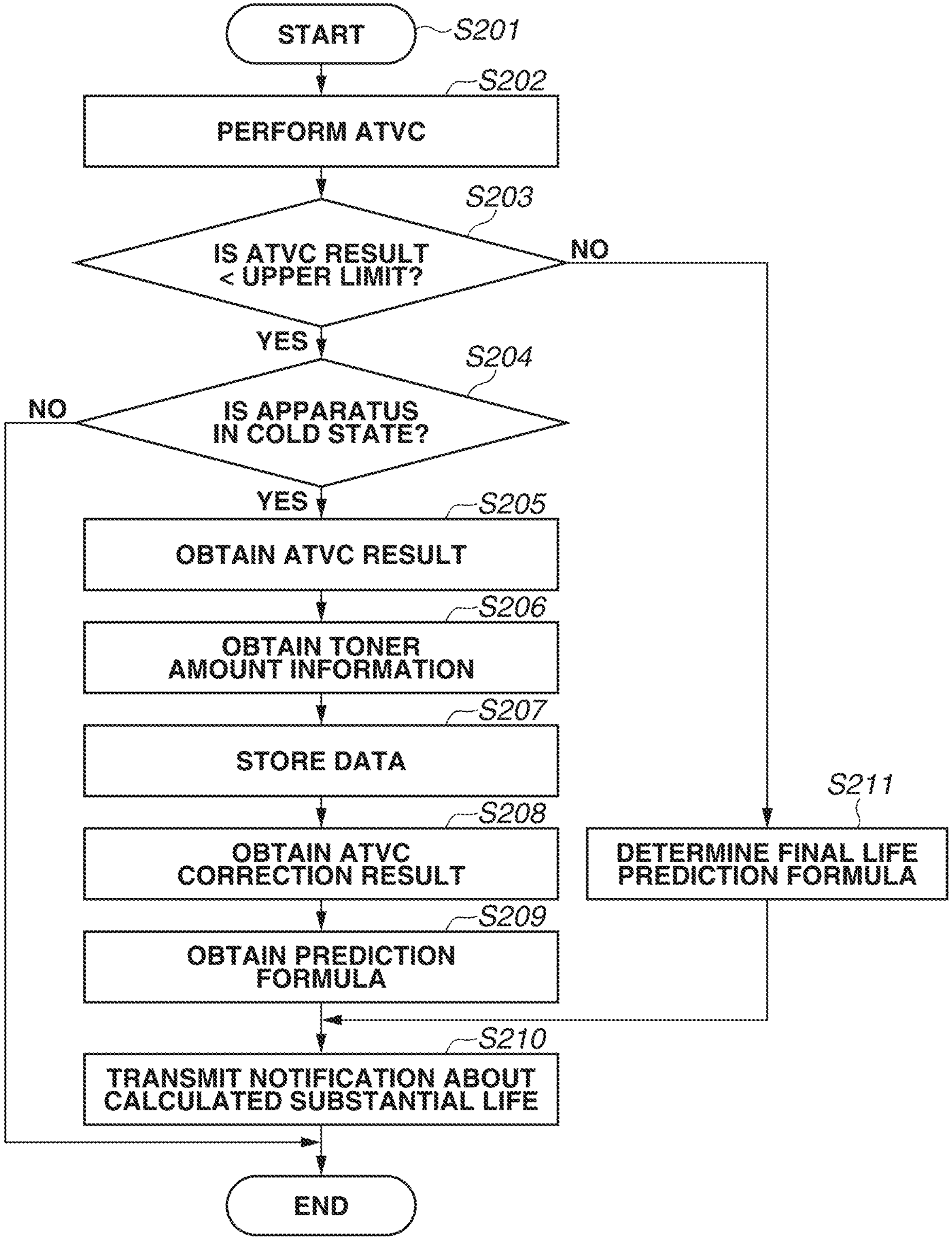
FIG. 10 is a flowchart illustrating an operation according to a second exemplary embodiment.

An image forming operation according to the second exemplary embodiment will be described with reference to a flowchart illustrated in FIG. 10.

When the printer engine receives a print instruction, in step S201, the engine control unit (CPU 26, arithmetic unit) starts the image forming operation. In step S202, the high-voltage control unit performs ATVC on the target current depending on print conditions. Next, in step S203, it is determined whether the applied voltage result that is the ATVC result obtained in step S202 has reached the upper limit of the high-voltage output.

If it is determined in step S203 that the applied voltage result has not reached the upper limit of the high-voltage output (YES in step S203), the processing proceeds to step S204. In step S204, when the image forming apparatus 100 forms an image, it is determined whether a state of the image forming apparatus 100 is the cold state.

Specifically, at the start of the image forming operation, an elapsed time from a last printing operation is measured and monitored by a timer incorporated in the main body, and it is determined whether the image forming apparatus 100 is in the cold state based on whether eight hours or longer have passed. If it is not determined that the image forming apparatus 100 is in the cold state (NO in step S204), the processing ends.

If it is determined that the transfer roller is in the cold state (YES in step S204), the processing proceeds to step S205. In step S205, the applied voltage result that is the obtained ATVC result is obtained. Instead of obtaining the ATVC result, the resistance value of the transfer member may be obtained. Next, in step S206, the image information obtaining unit obtains information about the amount of toner. In step S207, the obtained ATVC result and the result of obtaining the information about the amount of toner are stored in the RAM that is the data storage unit (memory) in the image forming apparatus 100. In step S208, the engine CPU (output unit, arithmetic unit) obtains the ATVC correction result that is the substantial transfer voltage used to calculate the substantial life based on the data on the ATVC result and the result of obtaining the information about the amount of toner that are obtained and stored in step S207. In step S209, the life prediction formula is obtained based on the ATVC correction result calculated in step S208. In step S209, as the prediction formula, the regression formula is calculated by regression calculation based on the ATVC correction result, as in the first exemplary embodiment.

Next, in step S210, the substantial life is calculated based on a ratio between a calculation result of the obtained regression formula and the upper limit of the high-voltage output, and a notification about the calculated substantial life is output to the operation panel included in the engine. If it is determined that the applied voltage result has reached the upper limit of the high-voltage output (NO in step S203), the processing proceeds to step S211. In step S211, the life prediction formula obtained immediately before the upper limit of the high-voltage output is reached is determined to be the final life prediction formula regardless of whether the transfer roller is in the cold state, and the life is predicted based on the final life prediction formula, and then a notification about the predicted life is transmitted.

As described above, in the present exemplary embodiment, in the case of obtaining the detection result of ATVC during image formation, the life is calculated based on data stored in the data storage unit (memory) and the CPU in the image forming apparatus 100 after the data that satisfies the predetermined condition is extracted to reduce variations in the detection result of ATVC. Therefore, it is possible to accurately calculate the substantial life even in a main body that is not connected to the server.

In both of the first and second exemplary embodiments, the cases where the secondary transfer roller 11 serves as the conductive member are described. The first and second exemplary embodiments can also be applied to a configuration for predicting the substantial life of a transfer roller that directly transfers toner from the photosensitive member, or the substantial life of a conductive member having a function for transferring toner, such as the primary transfer roller and the intermediate transfer belt.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-199632, filed Nov. 27, 2023, which is hereby incorporated by reference herein in its entirety.

What is claimed is:

1. An image forming apparatus comprising:

a photosensitive drum configured to carry a toner image formed based on image information;

a transfer member comprising a transfer roller configured to transfer the toner image carried on the photosensitive drum;

a high-voltage power supply configured to apply a voltage to the transfer member; and a controller configured to obtain information about an amount of toner in the toner image from the image information, obtain a correction value by correcting a voltage to be applied to the transfer member based on the information about the amount of toner, and obtain data on prediction of a life of the transfer member based on the correction value, wherein the voltage to be applied to the transfer member includes a detected transfer voltage obtained by automatic transfer voltage control in which the high-voltage power supply applies a voltage to the transfer member so that a predetermined current flows through the transfer member before image formation, wherein the controller is configured to determine a correction coefficient corresponding to the information about the amount of toner and obtain the correction value by correcting the detected transfer voltage using the correction coefficient, wherein the controller is configured to store the correction value in association with an amount of use of the transfer member, and wherein the controller is configured to obtain the data on prediction of the life of the transfer member by predicting, based on a temporal change of the stored correction value, a timing at which the correction value reaches an upper limit voltage of the high-voltage power supply.

2. The image forming apparatus according to claim 1, further comprising:
a current detection circuit configured to detect a current flowing through the transfer member; and
a voltage controller configured to control the voltage to be applied to the transfer member to cause a predetermined current to flow to the transfer member.

3. The image forming apparatus according to claim 2, further comprising a timer configured to measure an elapsed time from a time when an image is formed,
wherein the current detection circuit executes current detection after a lapse of a predetermined period,
wherein the voltage controller controls the voltage to be applied to the transfer member based on the current, and
wherein the controller obtains the data on the prediction of the life of the transfer member based on the correction value obtained by correcting the voltage to be applied to the transfer member based on a voltage applied to the transfer member after the lapse of the predetermined period and the information about the amount of toner.

4. The image forming apparatus according to claim 1,
wherein the image forming apparatus is an image forming apparatus configured to form an image using toner of a plurality of colors, and
wherein the information about the amount of toner is information about a maximum amount of toner in a case where the maximum amount of toner corresponds to an amount of toner in a portion with a largest amount of toner in a toner image formed by superimposing a plurality of toner colors.

5. The image forming apparatus according to claim 1, further comprising an operation panel, a display, or a speaker configured to notify a user of information about the life of the transfer member based on the data on the prediction of the life.

6. The image forming apparatus according to claim 5, wherein the information about the life is information about a remaining life of the transfer member.

7. An image forming apparatus comprising:
a photosensitive drum configured to carry a toner image formed based on image information;
a transfer member comprising a transfer roller configured to transfer the toner image carried on the photosensitive drum;
a high-voltage power supply configured to apply a voltage to the transfer member;
a current detection circuit configured to detect a current flowing through the transfer member; and
a controller configured to obtain information about an amount of toner in the toner image from the image information, obtain a resistance value of the transfer member based on the voltage to be applied to the transfer member and the current, obtain a correction value by correcting the resistance value based on the information about the amount of toner, and obtain data on prediction of a life of the transfer member based on the correction value,
wherein the resistance value is a detected resistance value obtained based on a detected transfer voltage and a detected current obtained by automatic transfer voltage control in which the high-voltage power supply applies a voltage to the transfer member so that a predetermined current flows through the transfer member before image formation,
wherein the controller is configured to determine a correction coefficient corresponding to the information about the amount of toner and obtain the correction value by correcting the detected resistance value using the correction coefficient,
wherein the controller is configured to store the correction value in association with an amount of use of the transfer member, and
wherein the controller is configured to obtain the data on prediction of the life of the transfer member by predicting, based on a temporal change of the stored correction value, a timing at which the correction value reaches an upper-limit resistance value.

8. The image forming apparatus according to claim 7, further comprising a voltage controller configured to control the voltage to be applied to the transfer member to cause a predetermined current to flow to the transfer member.

9. The image forming apparatus according to claim 8, further comprising a timer configured to measure an elapsed time from a time when an image is formed,
wherein the current detection circuit executes current detection after a lapse of a predetermined period,
wherein the voltage controller controls the voltage to be applied to the transfer member based on the current, and
wherein the controller obtains the data on the prediction of the life of the transfer member based on the correction value obtained by correcting the voltage to be applied to the transfer member based on a voltage applied to the transfer member after the lapse of the predetermined period and the information about the amount of toner.

10. The image forming apparatus according to claim 7,
wherein the image forming apparatus is an image forming apparatus configured to form an image using toner of a plurality of colors, and
wherein the information about the amount of toner is information about a maximum amount of toner in a case where the maximum amount of toner corresponds to an amount of toner in a portion with a largest amount of toner in a toner image formed by superimposing a plurality of toner colors.

11. The image forming apparatus according to claim 7, further comprising an operation panel, a display, or a speaker configured to notify a user of information about the life of the transfer member based on the data on the prediction of the life.

12. The image forming apparatus according to claim 11, wherein the information about the life is information about a remaining life of the transfer member.

13. An image forming system comprising:
an image forming apparatus including:
a photosensitive drum configured to carry a toner image formed based on image information;
a transfer member comprising a transfer roller configured to transfer the toner image carried on the photosensitive drum;
a high-voltage power supply configured to apply a voltage to the transfer member; and
an output unit configured to output a correction value obtained by correcting a detected transfer voltage based on information about an amount of toner in the toner image obtained from the image information,
wherein the detected transfer voltage is obtained by automatic transfer voltage control in which the high-voltage power supply applies a voltage to the transfer member so that a predetermined current flows through the transfer member before image formation;

a server including:

an obtaining unit connected to the image forming apparatus via a network and configured to obtain data on prediction of a life of the transfer member based on the correction value output from the image forming apparatus; and a transmission unit configured to transmit the data on the prediction of the life; and an information processing apparatus including:

a reception unit connected to the server via a network and configured to receive the data on the prediction of the life transmitted from the server; and an operation panel, a display, or a speaker configured to notify a user of information about the life of the transfer member based on the data on the prediction of the life, wherein the server is configured to store the correction value in association with an amount of use of the transfer member, and wherein the server is configured to obtain the data on prediction of the life of the transfer member by predicting, based on a temporal change of the stored correction value, a timing at which the correction value reaches an upper limit voltage of the high-voltage power supply.

14. The image forming system according to claim 13, wherein the image forming apparatus further includes:

a current detection circuit configured to detect a current flowing through the transfer member; and a voltage controller configured to control the voltage to be applied to the transfer member to cause a predetermined current to flow to the transfer member.

15. The image forming system according to claim 13, wherein the image forming apparatus is an image forming apparatus configured to form an image using toner of a plurality of colors, and wherein the information about the amount of toner is information about a maximum amount of toner in a case where the maximum amount of toner corresponds to an amount of toner in a portion with a largest amount of toner in a toner image formed by superimposing a plurality of toner colors.

16. The image forming system according to claim 13, wherein the information about the life is information about a remaining life of the transfer member.

* * * * *